United States Patent [19]

Sugahara et al.

[11] Patent Number: 5,994,668
[45] Date of Patent: Nov. 30, 1999

[54] LASER BEAM MACHINING METHOD WITH INTERRUPT AND RESTART FUNCTIONS

[75] Inventors: Masayuki Sugahara; Toshihiro Mori, both of Aichi, Japan

[73] Assignee: Mitsubishi Denki Kabushiki Kaisha, Tokyo, Japan

[21] Appl. No.: 08/947,749

[22] Filed: Oct. 9, 1997

Related U.S. Application Data

[62] Division of application No. 08/589,877, Jan. 23, 1996, Pat. No. 5,847,359.

[30] Foreign Application Priority Data

Jan. 31, 1995 [JP] Japan ......................... 7-13809

[51] Int. Cl.⁶ .................................................. B23K 26/00
[52] U.S. Cl. .............................. 219/121.72; 219/121.85
[58] Field of Search ........................... 219/121.6, 121.61, 219/121.62, 121.67, 121.72, 121.78, 121.85; 364/474.08

[56] References Cited

U.S. PATENT DOCUMENTS

| | | | |
|---|---|---|---|
| 5,182,434 | 1/1993 | Nakata ............... | 219/121.72 |
| 5,252,805 | 10/1993 | Nakata et al. ............. | 219/121.72 |
| 5,293,024 | 3/1994 | Sugahara et al. ......... | 219/121.67 |
| 5,444,211 | 8/1995 | Nakata et al. ............. | 219/121.67 |
| 5,449,881 | 9/1995 | Nakata et al. ............. | 219/121.67 |
| 5,585,018 | 12/1996 | Kanaoka et al. .......... | 219/121.72 |

FOREIGN PATENT DOCUMENTS

| | | | |
|---|---|---|---|
| 3-94987 | 4/1991 | Japan ..................... | 219/121.72 |
| 3106583 | 5/1991 | Japan . | |
| 6202722 | 7/1994 | Japan . | |

*Primary Examiner*—Gregory Mills
*Attorney, Agent, or Firm*—Sughrue, Mion, Zinn Mackpeak & Seas, PLLC

[57] ABSTRACT

A method for irradiating a workpiece making a relative move in accordance with a work program with a laser beam for cutting the workpiece includes steps of interrupting the cutting being executed and then restarting the cutting. As the cutting is restarted, machining of the workpiece is performed under specified conditions for a predetermined distance and a predetermined time to provide sufficient machining of the workpiece.

4 Claims, 15 Drawing Sheets

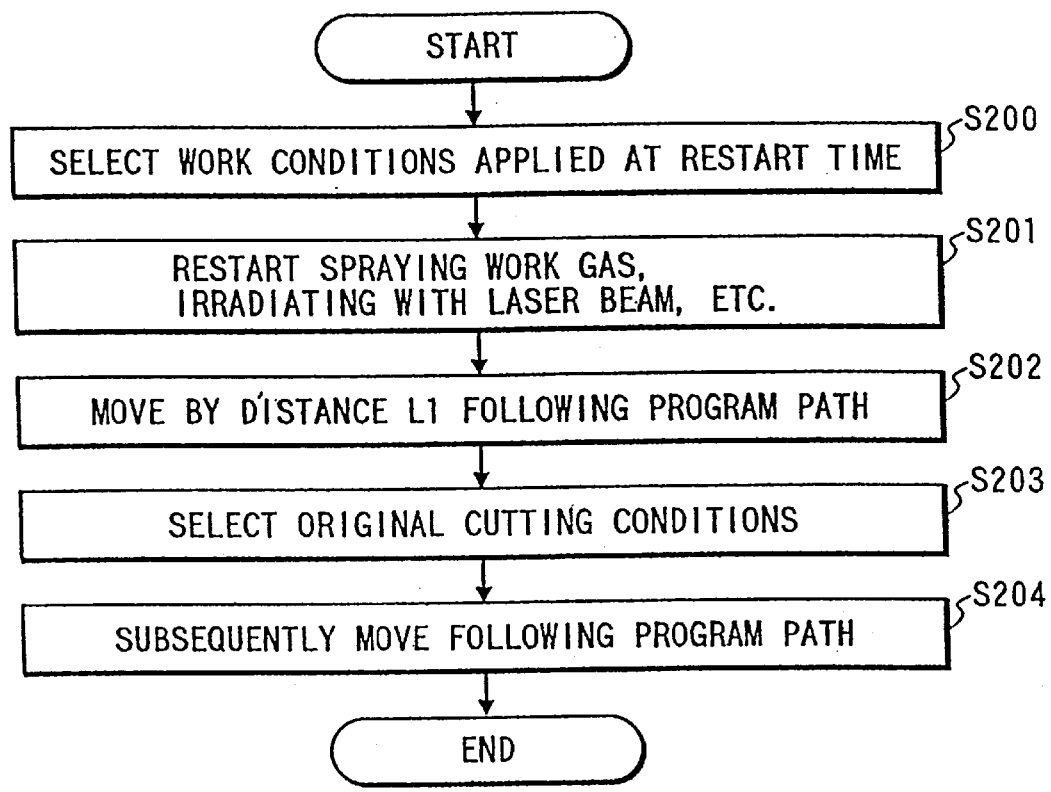
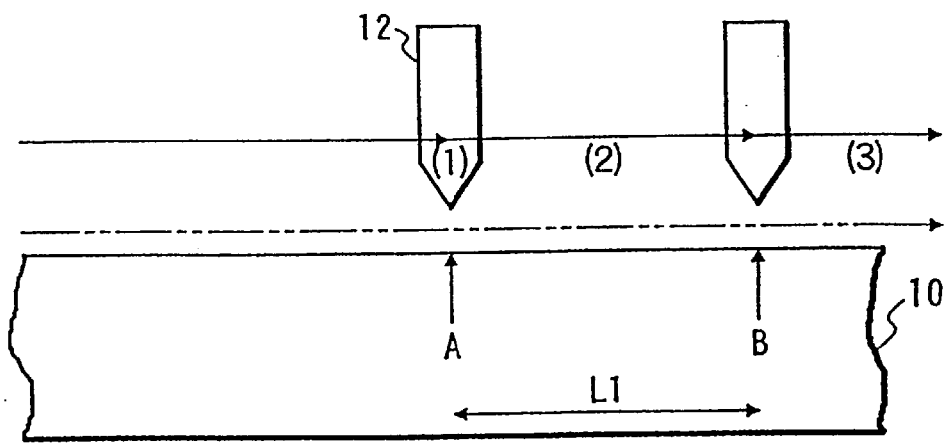
SOLID LINE: MOVE WITH IRRADIATION WITH LASER BEAM
ALTERNATE LONG AND TWO SHORT DASHES LINE: PROGRAMMED MOVE

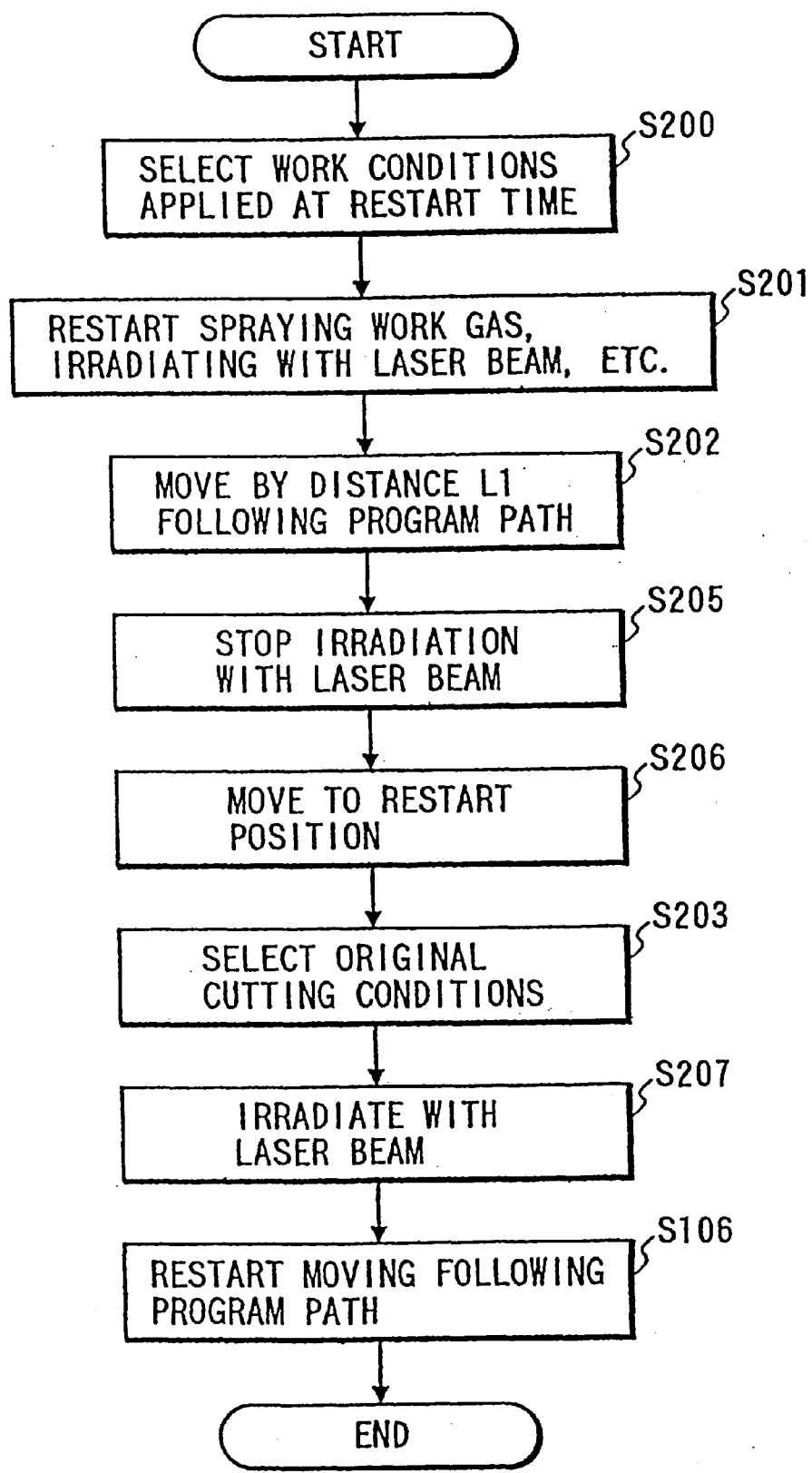

SOLID LINE: MOVE WITH IRRADIATION WITH LASER BEAM
BROKEN LINE: MOVE WITH LASER BEAM STOPPED
ALTERNATE LONG AND TWO SHORT DASHES LINE: PROGRAMMED MOVE

SOLID LINE: MOVE WITH IRRADIATION WITH LASER BEAM
BROKEN LINE: MOVE WITH LASER BEAM STOPPED
ALTERNATE LONG AND TWO SHORT DASHES LINE: PROGRAMMED MOVE

SOLID LINE: MOVE WITH IRRADIATION WITH LASER BEAM
ALTERNATE LONG AND TWO SHORT DASHES LINE: PROGRAMMED MOVE

SOLID LINE: MOVE WITH IRRADIATION WITH LASER BEAM
ALTERNATE LONG AND TWO SHORT DASHES LINE: PROGRAMMED MOVE

SOLID LINE: MOVE WITH IRRADIATION WITH LASER BEAM
ALTERNATE LONG AND TWO SHORT DASHES LINE: PROGRAMMED MOVE

SOLID LINE: MOVE WITH IRRADIATION WITH LASER BEAM
ALTERNATE LONG AND TWO SHORT DASHES LINE: PROGRAMMED MOVE

FIG. 17

| | | |
|---|---|---|
| WORK RESTART TYPE | | n |
| DISTANCE L1 | | ℓ1 |
| TIME T1 | | t1 |
| TIME T2 | | t2 |
| TIME T3 | | t3 |
| DISTANCE L2 | | ℓ2 |
| TIME T4 | | t4 |
| FIRST CONDITION GROUP (PIERCING) | LASER OUTPUT | s1 |
| | DUTY | d1 |
| | FREQUENCY | f1 |
| | PIERCING TIME | p1 |
| | ... | |
| SECOND CONDITION GROUP (CUTTING) | LASER OUTPUT | s2 |
| | DUTY | d2 |
| | FREQUENCY | f2 |
| | WORK SPEED | v2 |
| | ... | |
| THIRD CONDITION GROUP (RESTART WORK) | LASER OUTPUT | s3 |
| | DUTY | d3 |
| | FREQUENCY | f3 |
| | WORK SPEED | v3 |
| | ... | |
| ... | | ... |

PRIOR ART

FIG. 20A
WORK PROGRAM EXAMPLE

N01 M101: →SELECT PIERCING CONDITIONS

N02 M120: →EXECUTE PIERCING

N03 M103: →SELECT CUTTING CONDITIONS

N04 G1X100: ⎫
⎬ →MOVE IN RESPONSE TO CUT FORM
N98 G1Y100: ⎭

N99 M121: →TERMINATE CUTTING
(TURN OFF LASER BEAM AND WORK GAS)

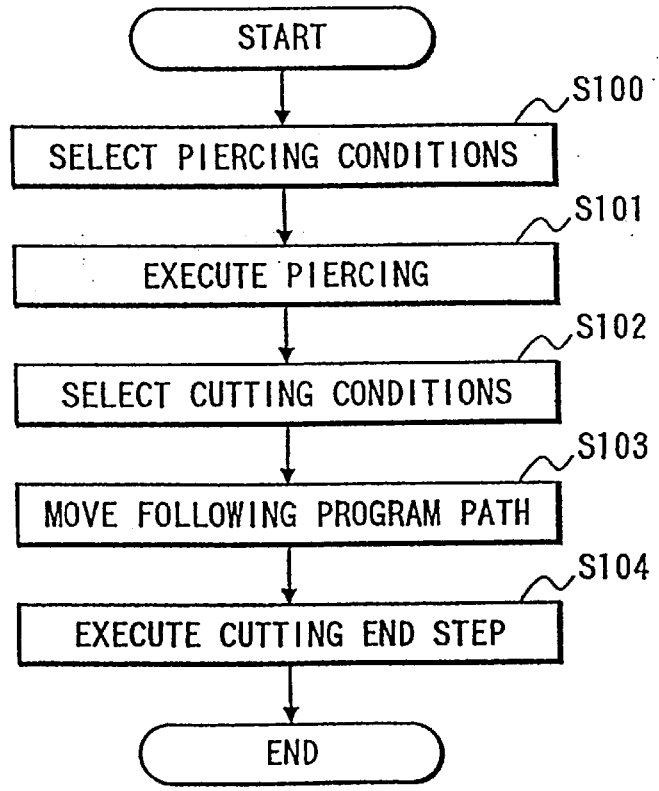

FIG. 20B
WORK PROCESS FLOW

PRIOR ART

START
↓
S100 SELECT PIERCING CONDITIONS
↓
S101 EXECUTE PIERCING
↓
S102 SELECT CUTTING CONDITIONS
↓
S103 MOVE FOLLOWING PROGRAM PATH
↓
S104 EXECUTE CUTTING END STEP
↓
END

LASER BEAM MACHINING METHOD WITH INTERRUPT AND RESTART FUNCTIONS

This is a divisional of application Ser. No. 08/589,877 filed Jan. 23, 1996 now U.S. Pat. No. 5,847,359.

BACKGROUND OF THE INVENTION

This invention relates to a laser beam machining system using a laser beam for cutting a workpiece and more particularly to an improvement in work failure at the work restart time after the work is interrupted.

FIG. 18 shows the configuration of a laser beam machine system. In a controller 1, a CPU (central processing unit) 2 reads a work program stored in a RAM 4 (random access memory) based on a control program stored in a ROM 3 (read-only memory) and controls the entire laser beam machining system. The RAM 4 stores work condition data, etc. in addition to the work programs. An I/O unit 5 converts a control signal output from the CPU 2 and sends the resultant control signal to a laser oscillator 6, which then performs emission, stopping, output change, etc., of a laser beam 7 in response to the received control signal. The laser beam 7 is sent via a mirror 8 to a laser beam machine 9.

The laser beam machine 9 is provided with a table to which a workpiece 10 is fixed and a work head 12 for irradiating the workpiece 10 with a laser beam. The laser beam 7 introduced into the work head 12 is gathered by a light gatherer disposed in the work head and is applied to the workpiece 10 through a nozzle 12a. At the same time, a work gas (not shown) is also sprayed to the workpiece through the nozzle. The laser beam machine 9 is provided with servo motors 13 and 14 for performing move control of the table 11 in two directions of X and Y axes. The servo motors 13 and 14 are connected to servo amplifiers 15 and 16 respectively in the controller 1 and are subjected to rotation control through the amplifiers in response to a control signal issued from the CPU 2. A move system in the Z axis direction for controlling the focus position of the laser beam applied to the workpiece 10 also exists, but here is omitted. Commands are given to the laser beam machining system and parameters are set for the system through a CRT/MDI unit 17.

FIG. 19 is a functional block diagram of the conventional laser beam machining system. The functions and configuration of the blocks will be discussed with reference to FIG. 19. In the controller 1, a program analysis section 18 analyzes the instruction contents of a work program and issues a command to a move command section 19 or a work condition command section 20. When receiving a work condition command from the program analysis section 18, the work condition command section 20 calls work condition data responsive to the command from a work condition registration section 21 and sets work conditions. If work condition values are specified directly in the program, the values are handled like the work condition data and the work conditions are set. The work condition data is data of piercing conditions, cutting conditions, etc., set in response to workpiece material and its plate thickness, such as laser output, duty, frequency, piercing time, etc., set as laser oscillator work conditions and speed set as a move condition of the laser beam machine for making a relative move of a workpiece with respect to a laser beam. If a move command is received from the program analysis section 18, the move command section 19 generates a travel distance from the work programmed path and setup work condition speed. An interrupt/restart determinating section 22 determines emergency stop to be caused by alarm occurrence, factitious temporary stop to be specified by a feed hold command, work restart to be specified by a work restart command such as the subsequent cycle start command, etc., and based on the determination, sends a stop/restart determination signal to the move command section 19 and the work condition command section 20. When receiving the stop/restart determination signal, the move command section 19 and the work condition command section 20 generate a move command and a work condition command and output them to the laser oscillator 6 and the laser beam machine 9.

FIG. 20A shows a work program example for the laser beam machining system and FIG. 20B shows a work process flow corresponding to the work program. The work operation will be discussed with reference to FIG. 20.

The program analysis section 18 analyzes the command on work program line N01 (piercing condition selection command) and outputs the piercing condition selection command. When receiving the piercing condition selection command, the work condition command section 20 calls piercing condition data stored in the work condition registration section 21 and sets piercing conditions at step S100 (the piercing is to make a hole at the work start time and the piercing condition data is laser output, duty, frequency, piercing time, etc.,). Likewise, the program analysis section 18 analyzes the command on work program line N02 (piercing execution command) and outputs the piercing execution command. Inputting the piercing execution command, the work condition command section 20 outputs a laser beam irradiation signal to the laser oscillator and waits for the piercing time set in the piercing conditions at step S101. Meanwhile, a through hole is made (completion of the piercing). Likewise, the program analysis section 18 analyzes the command on work program line N03 (cutting condition selection command) and outputs the cutting condition selection command. Inputting the cutting condition selection command, the work condition command section 20 calls cutting condition data and sets cutting conditions at step S102. Likewise, the program analysis section 18 analyzes the commands on work program lines N04 to N98 (move commands for moving the table in response to the cut shape) and outputs the move commands. Inputting the move commands, the move command section 18 drives the servo motors for moving the table at the speed set in the cutting conditions at step S103. As a result, the workpiece is cut to a desired shape. Subsequently, the program analysis section 18 analyzes the command on work program line N99 (cutting end command) and outputs the cutting end command. Inputting the cutting end command, the work condition command section 20 turns off the laser beam and work gas at step S104. Working of one workpiece is now complete.

If a temporary stop command is given due to alarm occurrence or by a feed hold command during the cutting following the program path (step S103), the interrupt/restart determinating section receives the temporary stop signal and outputs a work interrupt determination signal. When receiving the work interrupt determination signal, the move command section outputs a stop command for stopping the table move and the work condition command section outputs a stop command for stopping irradiation with the laser beam, spraying of the work gas, etc. Upon reception of the stop commands, the laser beam machining is stopped. Then, if a work continuation command is given by a cycle start command, the laser beam machining is restarted.

FIG. 21 shows a process flow at the work restart time. The operation at the restart time will be discussed with reference to FIG. 21. When a work restart command is given, the interrupt/restart determinating section receives the work restart command, determines work restart, and outputs a work start determination signal. Inputting the work start determination signal, the work condition command section restores the state required for the work gas spraying, laser beam irradiation, etc., to the state before the temporary stop (containing the work conditions) at step S105. Next, the move command section outputs a restart move command at step S106 and the cutting is restarted.

FIG. 22 is an illustration showing how laser cutting is performed. When cutting of the workpiece 10 by the laser beam 7 proceeds, a bottom face 10b of the workpiece 10 lags in the cutting progress behind a top face 10a (m shown in FIGS. 22 and 23). The thicker the workpiece and the faster the work speed, the more remarkable the tendency (as shown in FIG. 23). Therefore, if a temporary stop command is given during the cutting and the working is stopped, the top face of the workpiece is cut, but uncut portion m remains in the bottom face at the stop position. After this, if a work restart command is given in the state and the cutting is started in the same cutting conditions as before the stop, a flow of molten metal at the start time worsens because of the uncut portion m in the cutting restart part; work failure easily occurs.

SUMMARY OF THE INVENTION

It is therefore an object of the invention to provide a laser beam machining system which can select optimum work conditions at a restart point and restart cutting when restarting cutting after temporary stop of cutting containing emergency stop. For reference, FIG. 23 is an illustration as to how the lag amount indicated by distance m in FIG. 22 varies depending on the plate thickness and cutting speed with two plate thicknesses of soft steel material (hatched portions denote variations).

To this end, according to the invention, there is provided a laser beam machining system comprising a controller, a laser oscillator for generating and outputting a laser beam upon reception of a work command for laser oscillation from the controller, and a laser beam machine for receiving the laser beam, gathering it, and irradiating a workpiece with the gathered laser beam and upon reception of a work command for a work path move from the controller, the laser beam machine for making a relative move of the workpiece with respect to a work head, the controller comprising a program analysis section for analyzing a work program in accordance with a control program procedure and generating and outputting work program commands, a work condition registration section for storing work condition data of piercing, cutting, restart work, etc., and selectively outputting the work condition data in response to a request, a work command section, upon reception of the work program command, for calling the corresponding work condition data from the work condition registration section and generating and outputting the work command for laser oscillation and the work command for a work path move, and a restart command section, when outputting a restart command to the work command section and generating a restart work command upon reception of a restart signal for releasing a stop state, for calling work condition data for restart work from the work condition registration section in conjunction with the work command section, using the work condition data to correct a work command based on a work program command after the stop, and causing the work command section to output the corrected work command.

The restart command section in the laser beam machining system comprises a restart command section for determining a work restart signal, generating a restart command, outputting it to the work command section for calling the work condition data for restart work from the work condition registration section, using the work condition data to correct a work command based on a work program command after the stop, and outputting the corrected work command as a restart work command, a move distance calculation section, upon reception of the restart command and the restart work command, for adding up work path move distances and outputting the result value, a distance setting section for outputting distance L1 for restart work preset therein in response to a request, and a move distance comparison section, upon reception of the result value, for calling the distance L1 and comparing it with the result value and if they match, the move distance comparison section for outputting a restart work distance match signal to the work command section for causing the work command section to terminate generation of the restart work command and return to motion in accordance with the work program commands.

According to the invention, there is provided a laser beam machining method for irradiating a workpiece making a relative move in accordance with a work program with a laser beam for cutting the workpiece, to interrupt the cutting being executed and restart the cutting at the interrupt position, the method comprising the steps of:

after the restart, working on a move path specified in the work program at a predetermined distance L1 under restart work conditions, and changing the restart work conditions to original work conditions for continuing the cutting.

According to the invention, there is provided a laser beam machining method for irradiating a workpiece making a relative move in accordance with a work program with a laser beam for cutting the workpiece, to interrupt the cutting being executed and restart the cutting at the interrupt position, the method comprising the steps of:

after the restart, working on a moving path specified in the work program at a predetermined distance L1 under restart work conditions, after working at the predetermined distance L1, returning the work position to the work restart position, and changing the restart work conditions to original work conditions for continuing the cutting.

According to the invention, there is provided a laser beam machining system comprising a controller, a laser oscillator for generating and outputting a laser beam upon reception of a work command for laser oscillation from the controller, and a laser beam machine for receiving the laser beam, gathering it, and irradiating a workpiece with the gathered laser beam and upon reception of a work command for a work path move from the controller, the laser beam machine for making a relative move of the workpiece with respect to a work head, the controller comprising:

a program analysis section for analyzing a work program in accordance with a control program procedure and generating and outputting work program commands;

a work condition registration section for storing work condition data of piercing, cutting, restart work, etc., and selectively outputting the work condition data in response to a request;

a work command section, upon reception of the work program command, for calling the corresponding work condition data from the work condition registration section and generating and outputting work commands for operating the laser oscillator and the laser beam machine;

a restart command section, when outputting a restart command to the work command section and generating a restart work command upon reception of a restart signal for releasing a stop state, for calling work condition data for restart work from the work condition registration section in conjunction with the work command section, using the work condition data to correct a work command based on a work program command after the stop, and causing the work command section to output the corrected restart work command; and a cooling command section for stopping a work command based on the work program for a predetermined time in conjunction with the work command section after the restart work command.

The cooling command section in the laser beam machining system comprises a timer for starting counting up the elapsed time since output of the restart work command and outputting the count time, a time setting section in which time T1 is previously stored, and a stop time comparison section, upon reception of the count time output from the timer, for comparing the time with the time T1 called from the time setting section and if they match, the stop time comparison section for outputting a match signal to the work command section for returning to motion following work program commands after the restart work command.

According to the invention, there is provided a laser beam machining method for irradiating a workpiece making a relative move in accordance with a work program with a laser beam for cutting the workpiece, to interrupt the cutting being executed and restart the cutting at the interrupt position, the method comprising the steps of:

after the restart, working on a moving path specified in the work program at a predetermined distance L1 under restart work conditions, after working at the predetermined distance L1, returning the work position to the work restart position, continuing to irradiate the return position with a laser beam for a predetermined time, and changing the restart work conditions to original work conditions for continuing the cutting.

According to the invention, there is provided a laser beam machining method for irradiating a workpiece making a relative move in accordance with a work program with a laser beam for cutting the workpiece, to interrupt the cutting being executed and restart the cutting at the interrupt position, the method comprising the steps of:

after the restart, working under restart work conditions without a move for a predetermined time, and changing the restart work conditions to original work conditions for continuing the cutting.

According to the invention, there is provided a laser beam machining method for irradiating a workpiece making a relative move in accordance with a work program with a laser beam for cutting the workpiece, to interrupt the cutting being executed, the method comprising the step of, at the interrupt time, continuing to irradiate the position with a laser beam for a predetermined time under interrupt work conditions and then interrupting the work.

According to the invention, there is provided a laser beam machining method for irradiating a workpiece making a relative move in accordance with a work program with a laser beam for cutting the workpiece, to interrupt the cutting being executed and restart the cutting at the interrupt position, the method comprising the steps of:

cutting the workpiece while making a backward move of a moving path before the interrupt specified in the work program by a predetermined distance under backward move work conditions, and continuing cutting the workpiece again in an original cutting direction under original work conditions.

According to the invention, there is provided a laser beam machining method for irradiating a workpiece making a relative move in accordance with a work program with a laser beam for cutting the workpiece, the method comprising the step of:

when a work condition is changed from a low-output laser beam to a high-output laser beam, stopping a work path move for a predetermined time and then irradiating the workpiece with the high-output laser beam.

In the laser beam machining system (aspect 1), when outputting a restart command to the work command section and generating a restart work command upon reception of a restart signal after a stop command, the restart command section calls work condition data for restart work from the work condition registration section in conjunction with the work command section, uses the work condition data to correct a work command based on a work program command after the stop, and causes the work command section to output the corrected work command.

The restart command section in the laser beam machining system (aspect 2) determines a work restart signal, outputs a restart command to the work command section, and causes the work condition registration section to output a restart work command, the move distance calculation section adds up move command distances from the restart work command and outputs the result value, and the move distance comparison section compares the result value with a predetermined distance L1 and if they match, outputs a restart work distance match signal to the work command section for causing the work command section to terminate generation of the restart work command and return to motion in accordance with the work program commands.

The laser beam machining method for irradiating a workpiece making a relative move in accordance with a work program with a laser beam for cutting the workpiece (aspect 3), to interrupt the cutting being executed and restart the cutting at the interrupt position, comprising the steps of:

after the restart, working on a moving path specified in the work program at a predetermined distance L1 under restart work conditions, and changing the restart work conditions to original work conditions for continuing the cutting.

The laser beam machining method (aspect 4) comprises the first step of working at a predetermined distance L1 under restart work conditions after the restart and the second step of returning the work position to the work restart position.

When outputting a restart command to the work command section and generating a restart work command upon reception of a restart signal, the restart command section in the laser beam machining system (aspect 5) uses work condition data for restart work to correct a work command based on a work program command after the stop in conjunction with the work command section and causes the work command section to output the corrected work command, and the cooling command section stops a work command based on the work program for a predetermined time in conjunction with the work command section after the restart work command.

The cooling command section in the laser beam machining system (aspect 6) uses the timer to count up the elapsed time since output of the restart work command and output the count time, and the stop time comparison section compares the count time with the time T1 called from the time setting section and if they match, outputs a match signal to the work command section for returning to motion following work program commands after the restart work command.

The laser beam machining method (aspect 7) comprises the first step of cutting the moving path specified in the work program at a predetermined distance under restart work conditions, the second step of returning the work position to the work restart position, and the third step of stabilizing laser beam output for cutting.

The laser beam machining method (aspect 8) comprises the first step of irradiating the workpiece with a laser beam under restart work conditions without a move for a predetermined time to remove the bottom face work lag.

The laser beam machining method (aspect 9) comprises the step of irradiating the position at the interrupt time with a laser beam for a predetermined time under interrupt work conditions to remove the bottom face work lag and then interrupting the work.

The laser beam machining method (aspect 10) comprises the first step of cutting the workpiece while making a backward move of a moving path before the interrupt by a predetermined distance under backward move work conditions, and the second step of continuing cutting the workpiece again in an original cutting direction under original work conditions to make the cut work surface continuous.

The laser beam machining method (aspect 11) comprises the step of, when a work condition is changed from a low-output laser beam to a high-output laser beam, stopping a work path move for a predetermined time and then irradiating the workpiece with the high-output laser beam to stabilize the laser beam output.

BRIEF DESCRIPTION OF THE DRAWING

FIG. 2 is a work process flowchart according to the first embodiment of the invention;

FIG. 3 is a drawing showing how to work on a workpiece according to the first embodiment of the invention;

FIG. 4 is a work process flowchart according to a second embodiment of the invention;

FIG. 17 is a registered work condition data example showing an eighth embodiment of the invention;

FIG. 20A is a work program example for the laser beam machining system and FIG. 20B is a process flow chart corresponding thereto;

DETAILED DESCRIPTION OF THE PREFERRED EMBODIMENTS

Referring now to the accompanying drawings, there are shown preferred embodiments of the invention.
(Embodiment 1)

Figure 1:
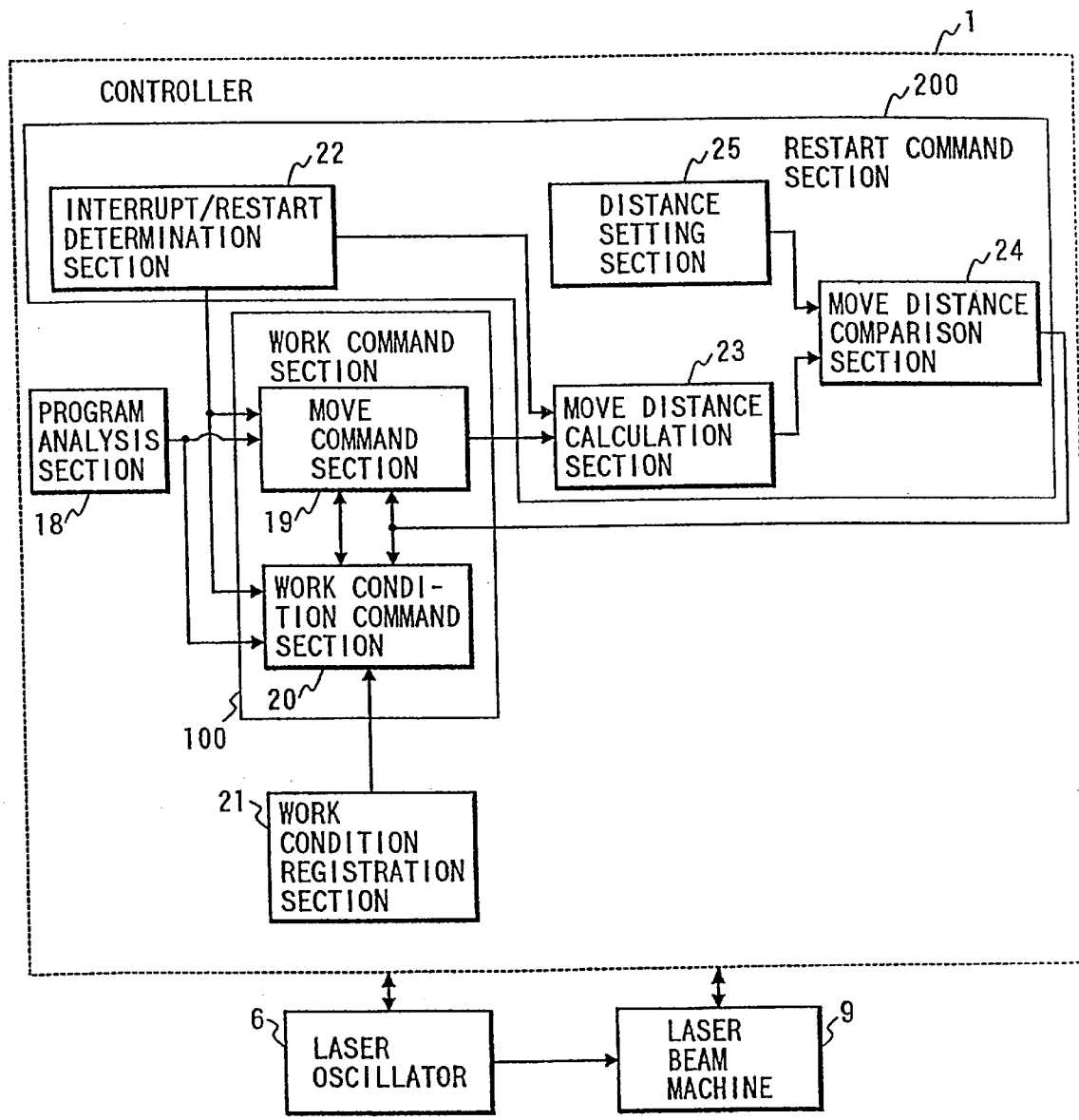
FIG. 1 is a functional block diagram of a first embodiment of the invention.
Figure 18:
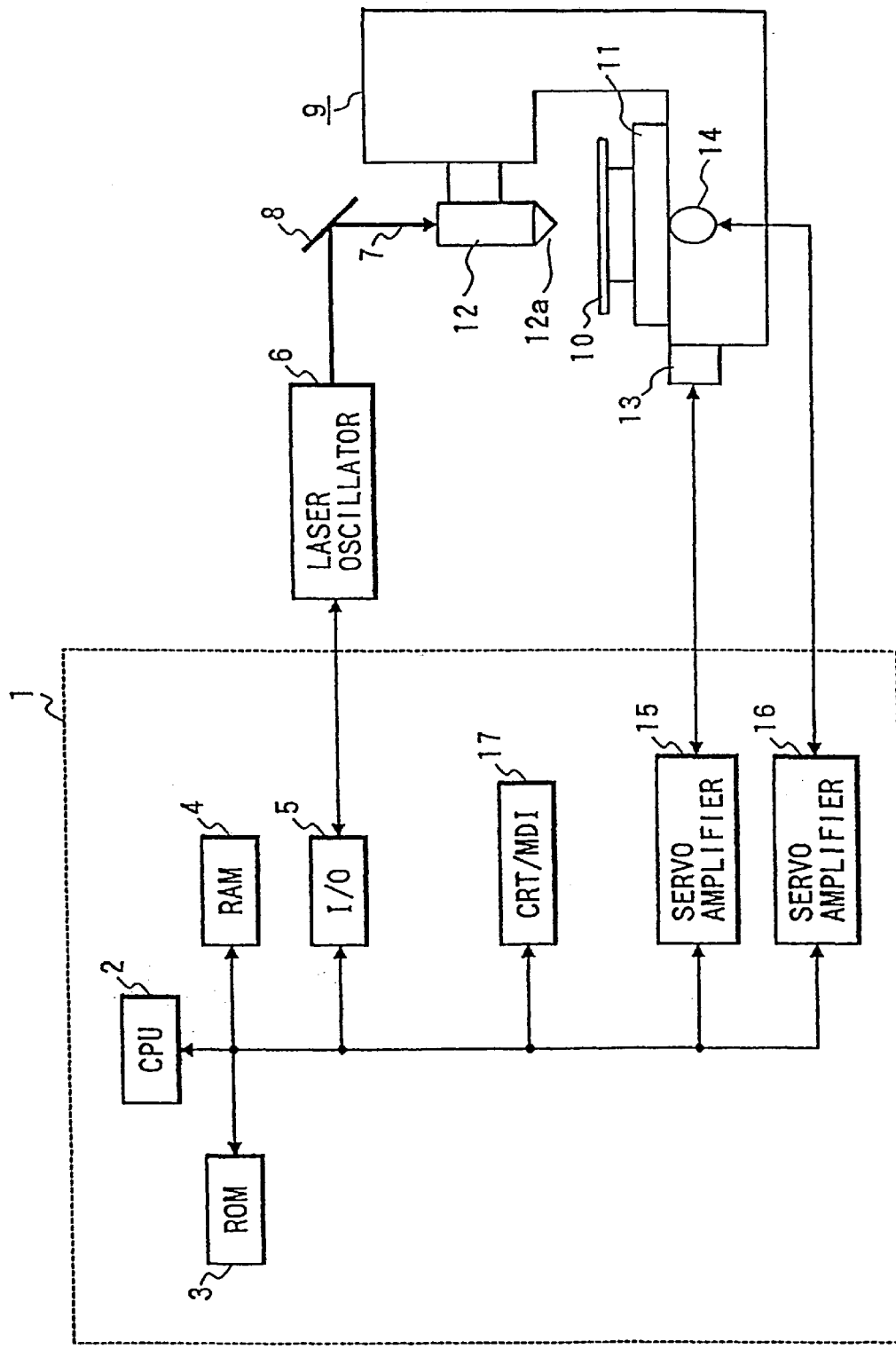
FIG. 18 is a block diagram of a laser beam machining system.
Figure 19:
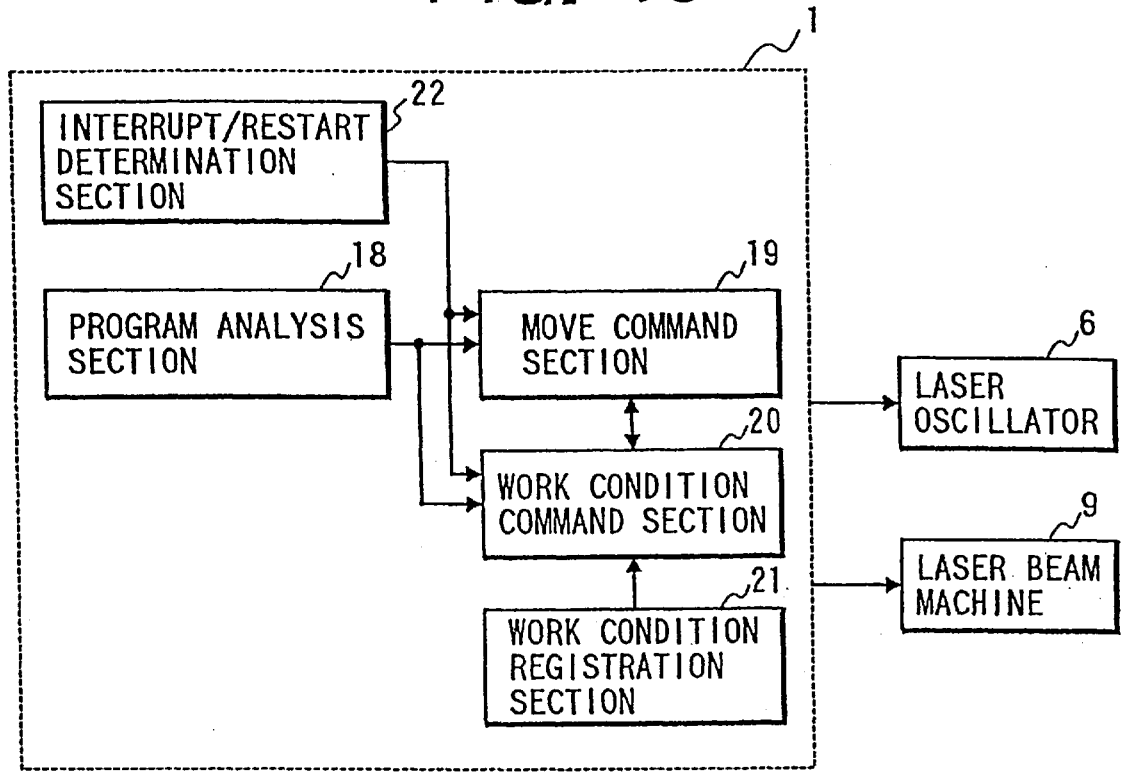
FIG. 19 is a functional block diagram of the conventional laser beam machining system.

FIG. 1 is a functional block diagram of a laser beam machining system according to a first embodiment of the invention. The configuration of the embodiment will be discussed with reference to FIGS. 1 and 18.

The laser beam machining system consists of a controller 1, a laser oscillator 6, and a laser beam machine 9. The laser oscillator 6 and the laser beam machine 9 operate based on commands of the controller 1 and feed back their operation state to the controller 1.

The controller 1 consists of a work command section 100 comprising a program analysis section 18, a work condition registration section 21, a move command section 19, and a work condition command section 20 and a restart command section 200 comprising an interrupt/restart determination section 22, a move distance calculation section 23, a move distance comparison section 24, and a distance setting section 25.

The program analysis section 18, which is made up of a CPU 2, a ROM 3 for storing a control program, a RAM 4 for storing work programs, etc., analyzes the contents of a work program according to the control program procedure and outputs the analysis results as work program commands including moving path commands, work condition commands, etc.

The work command section 100 comprising the move command section 19 and the work condition command section 20 is made up of the CPU 2, an I/O unit 5, servo amplifiers 15 and 16, etc. Upon reception of a work program command, such as a moving path command or a work condition command, output by the program analysis section 18, the work command section 100 calls the work condition data corresponding to the command from the work condition registration section 21. The work condition command section 20 generates and outputs work commands (laser oscillation commands) containing laser output, duty, frequency, etc., for operating the laser oscillator 6. The move command section 19 generates and outputs work commands (laser beam machining commands) containing the amount, speed, etc., for operating servo motors 13 and 14 of the laser beam machine 9.

If work condition values are specified directly in a work program, they are handled as work condition data.

Until completion of restart working after reception of a restart command signal (described below) output from the restart command section 200, the work command section 100 in conjunction with the restart command section 200 generates and outputs work commands including a laser oscillation command, laser beam machining command, etc., for restart working, as discussed below in detail.

The work condition registration section 21 consists of components such as the RAM 4 for storing work condition data and a CRT/MDI unit 17 which serves as an input section and a display section of conditions such as work condition data, and selectively outputs work condition data based on a request made by the work command section 100. The work condition data includes first to third condition groups, etc., shown in FIG. 17; optimum data is input depending on the material and plate thickness of a workpiece 10.

The restart command section 200 comprising the interrupt/restart determination section 22, the move distance calculation section 23, the move distance comparison section 24, and the distance setting section 25 is made up of the CPU 2, the ROM 3, the RAM 4, etc. The interrupt/restart determination section 22 determines temporary stop to be caused by alarm occurrence or specified by a feed hold command and work restart to be specified by the subsequent cycle start command, and sends the determination to the work command section 100 (the move command section 19 and the work condition command section 20) and the move distance calculation section 23. The move distance calculation section 23 calculates the move distance in a work command (move command) after the interrupt/restart determination section 22 determines work restart. The move distance comparison section 24 compares the move distance calculated by the move distance calculation section 23 with distance L1 preset in the distance setting section 25 for determining whether or not the move made after the work restart has proceeded a predetermined distance. If they match, the move distance comparison section 24 sends a match signal to the work command section 100 (the move command section 19 and the work condition command section 20). The work command section 10 generates a move command and a work condition command not contained in the original work program in response to the information provided by the interrupt/restart determination section 22 and the move distance comparison section 24.

FIG. 2 is a process flowchart at the work restart time showing the embodiment of the invention. The operation will be discussed with reference to the figure. If a work restart command is given after temporary stop of work, the work command section 100 (work condition command section 20) calls and sets work condition data for work restart at step S200 in response to work restart information provided by the interrupt/restart determination section 22. For the work restart conditions, low-speed, low-output, low-frequency pulse dedicated conditions for enabling cutting even if a cut lag part in the bottom face of the workpiece exists are registered in the work condition registration section 21 (RAM 4) as the work condition data. Cut conditions at the work stop time are saved before change to the conditions applied at the work restart time is made. Next, the work condition command section 20 restores the functions required for work such as work gas spraying and laser beam irradiation to the state before the temporary stop at step S201. The sprayed work gas pressure and applied laser beam output at the time become the condition values set for the work restart. The move command of the work command section 100 (move command section 19) causes a move to be restarted and made by the predetermined distance L1 at step S202. This means that the workpiece is cut by the distance L1 under the work restart conditions. While the workpiece is cut under the low-speed work restart conditions, the bottom face cut lag behind the top face of the workpiece lessens. The distance L1 set in the distance setting section 25 is a cut distance required by the time the lag sufficiently lessens. Inputting the information "distance L1 move after work restart" from the move distance comparison section 24, the work command section 100 (work condition command section 20) sets the stored original cutting conditions at step S203. Then, the work command section 100 (move command section 19) outputs a work command for continuing the interrupted cutting under the original cutting conditions at step S204.

FIG. 3 shows the working method in the embodiment.
(1) Interrupt the work at position A of workpiece 10 and then restart the work;
(2) cut the workpiece 10 following the program path by distance L1 under work restart conditions; and
(3) cut the workpiece 10 under the original work conditions.

Thus, according to the embodiment, after a work interrupt command is received during working in accordance with the work program, to restart the interrupted work, work conditions appropriate for restart work are automatically generated and the work is restarted by the distance L1 under the generated conditions rather than restarting under the work conditions applied at the work interrupt time specified in the work program. Therefore, after the bottom face cut lag behind the top face of the workpiece is lessened, cutting can be continued; work failure at the restart work time can be prevented.

(Embodiment 2)

FIG. 4 is a process flowchart at the work restart time showing a second embodiment of the invention. In the first embodiment, after the bottom face cut lag behind the top face of the workpiece is lessened, cutting can be continued; if the plate thickness increases, the bottom face cut lag does not entirely disappear even under the low-speed work restart conditions. Particularly, if the work speed of the cut condition is fast, it is necessary to smooth a flow of molten metal in the cut starting portion. The second embodiment of the invention is suitable for such a purpose. The operation will be discussed.

Figure 21:
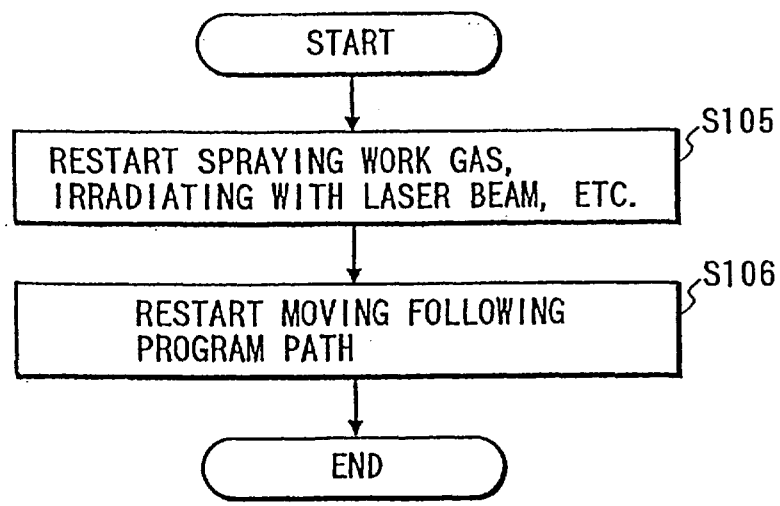
FIG. 21 is a conventional process flowchart at the work restart time.
Figure 22:
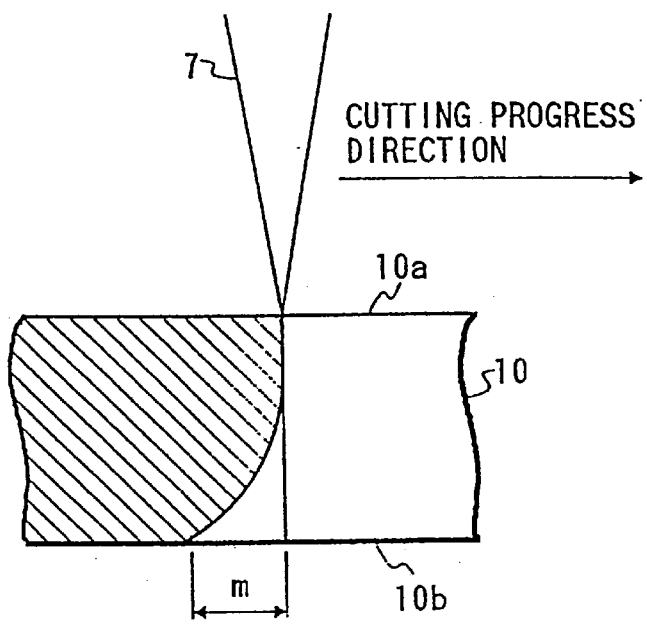
FIG. 22 is an illustration showing how laser beam machining is performed.
Figure 23:
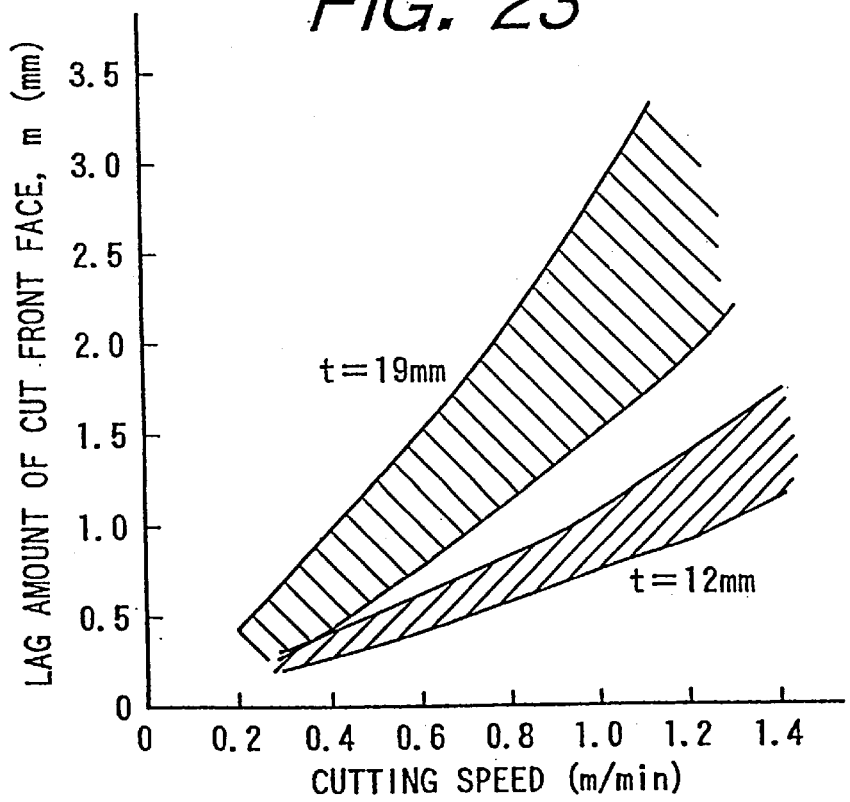
FIG. 23 is a graph showing lag amount change of a front face depending on the plate thickness and cutting speed.

Steps S106 and S200 to S203 in FIG. 4 are the same as those in FIGS. 21 and 2. Inputting the information "distance L1 move after work restart" from a move distance comparison section, a work condition command section temporarily stops irradiation with a laser beam at step S205. To do this, a laser beam irradiation stop signal may be output to a laser oscillator or an output command is set to 0. A move command section moves a table for returning the work position to the work stop position at step S206. Next, the work condition command section sets the stored original cut conditions at step S203 and irradiation with a laser beam is restarted at step S207. After this, the move command section restarts a move at step S106. The already cut L1 portion is passed through and cutting is continued.

Figure 5:
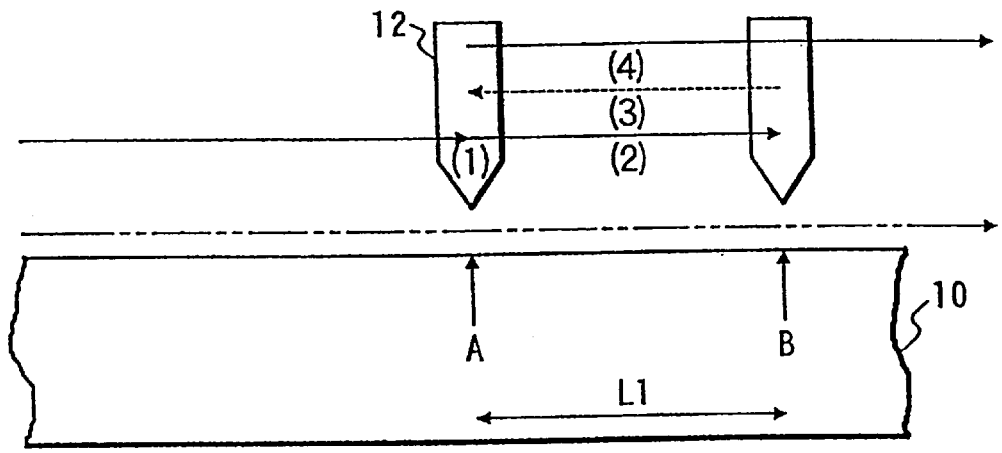
FIG. 5 is a drawing showing how to work on a workpiece according to the second embodiment of the invention.

FIG. 5 shows the working method in the embodiment.
(1) Interrupt the work at position A of workpiece 10 and then restart the work;
(2) cut the workpiece 10 following the program path by distance L1 under work restart conditions;
(3) stop irradiation with a laser beam and return to position A; and
(4) irradiate the workpiece 10 with a laser beam for cutting the workpiece 10 under the original work conditions.

According to the embodiment, work conditions appropriate for restart work are automatically generated and the work is restarted by the distance L1 under the generated conditions and then the work position is returned to the interrupt position for restarting the cutting under the original work conditions. Therefore, after the bottom face cut lag behind the top face of the workpiece is lessened, cutting can be continued; work failure at the restart work time can be prevented. In addition, the cut starting portion becomes a work finish face as provided as if the cutting were continued nonstop.

(Embodiment 3)

Figure 6:
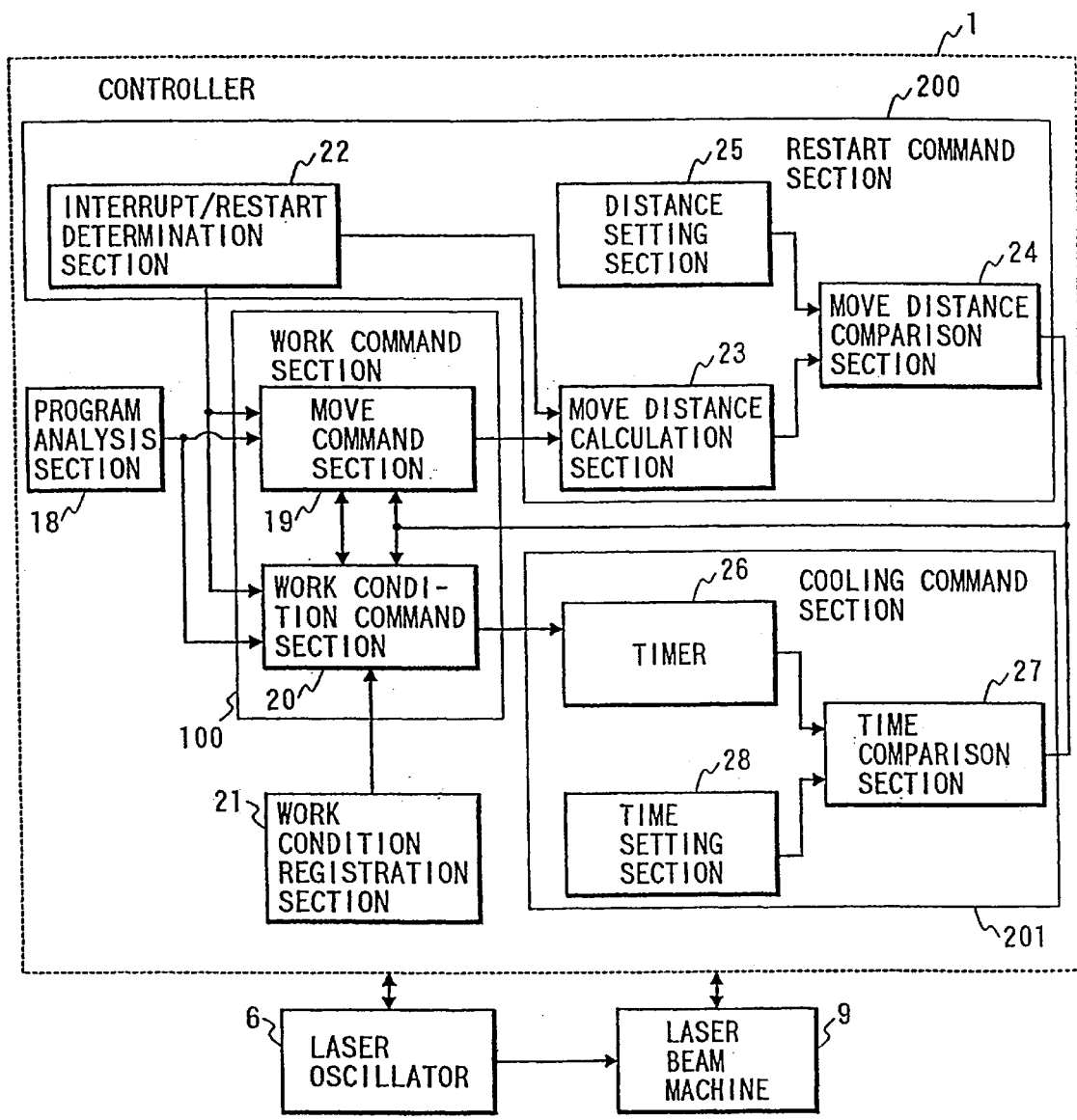
FIG. 6 is a functional block diagram of a third embodiment of the invention.

FIG. 6 is a functional block diagram of a laser beam machining system according to a third embodiment of the invention. A flow of molten metal is smoothed as if work continued nonstop according to the second embodiment. However, if heat of the workpiece much accumulates at the work stop time, there is the possibility of work failure. The third embodiment is provided for taking countermeasures against it.

Blocks 18 to 25 in FIG. 6 are the same as those in FIG. 1 and will not be discussed again. A cooling command section 201 receives command information indicating work completion at distance L1 in restart work from a work command section 100 (work condition command section 20) and measures the time with a timer 26 in response to the command. A time comparison section 27 compares the measured time with time T1 preset in a time setting section 28 and if they match, sends a cooling end command to the work command section 100 (move command section 19 and work condition command section 20). Upon reception of the command, the work command section 100 restarts cutting under the cut condition applied at the interrupt time.

Figure 7:
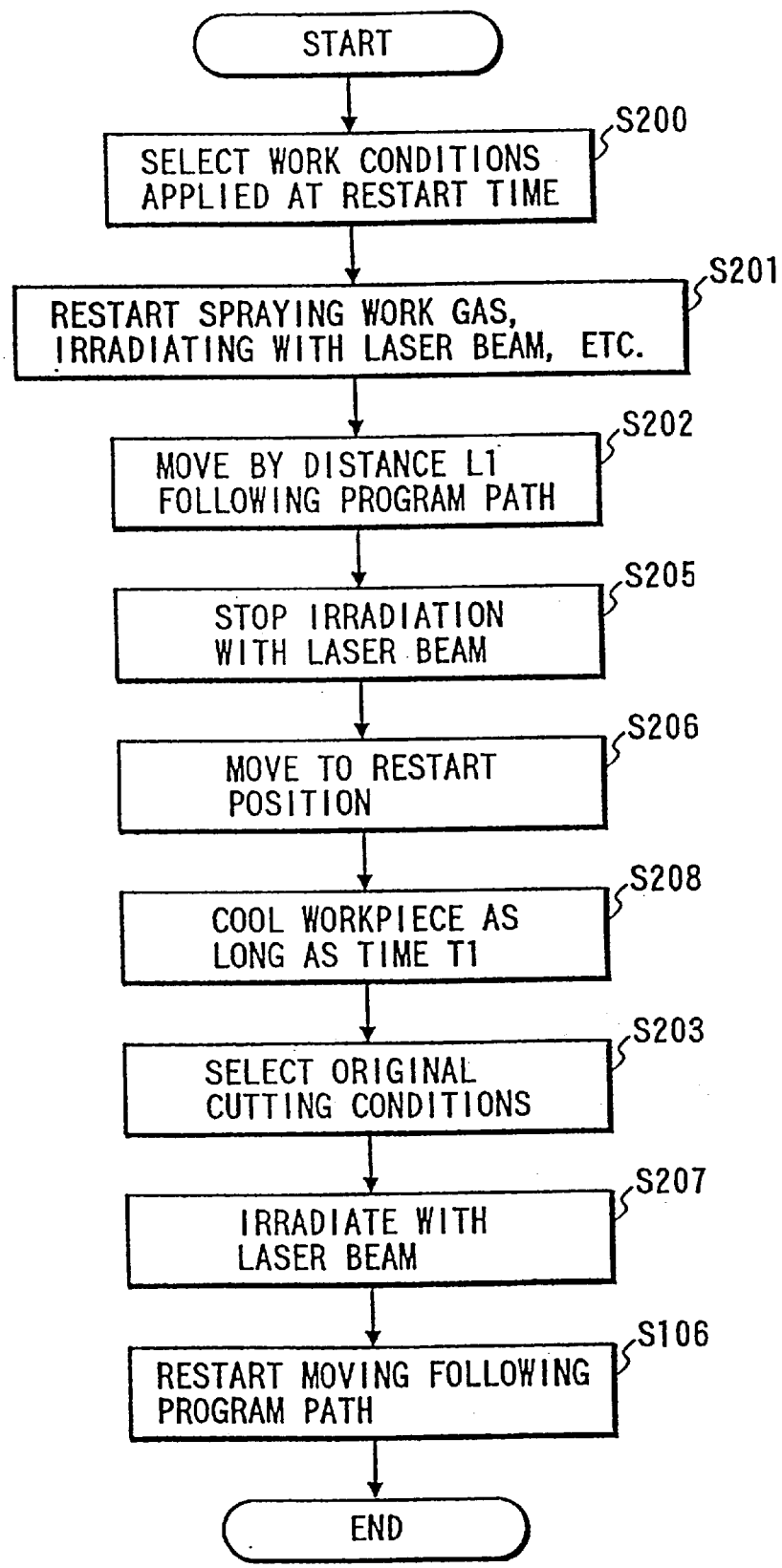
FIG. 7 is a work process flowchart according to the third embodiment of the invention.

FIG. 7 is a process flowchart of the embodiment of the invention. Steps S200 to S207 and S106 in FIG. 7 are the same as those in FIG. 4. The laser beam irradiation stop time is measured with the timer 26 and at step S208, the workpiece is cooled until a lapse of the time T1 set by the time setting section. To do this, a cooling material spray dedicated to cooling may be attached or simply spraying a work gas has the effect of cooling because irradiation with a laser beam stops. Cooling at step S208 may be executed before a return to the restart position at step S206 if laser beam irradiation stops.

Figure 8:
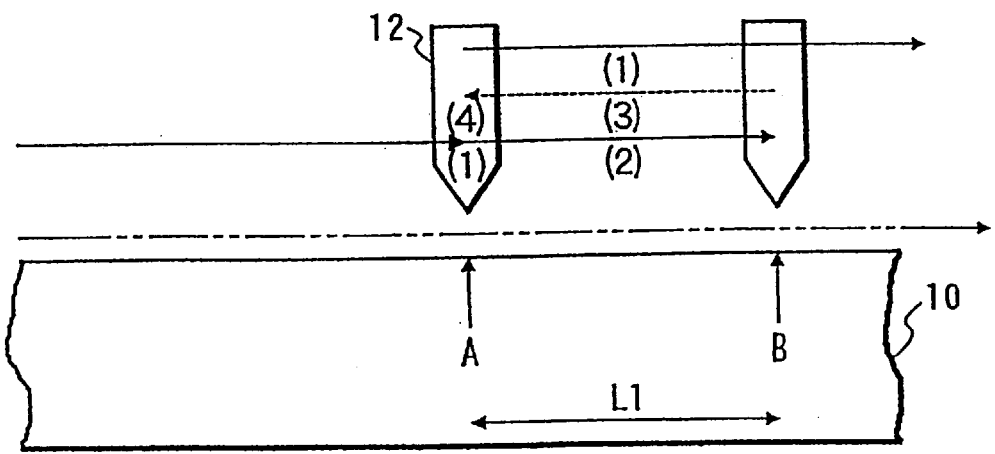
FIG. 8 is a drawing showing how to work on a workpiece according to the third embodiment of the invention.

FIG. 8 shows the working method in the embodiment.

(1) Interrupt the work at position A of workpiece 10 and then restart the work;

(2) cut the workpiece 10 following the program path by distance L1 under work restart conditions;

(3) stop irradiation with a laser beam and return to position A;

(4) cool the workpiece 10 as long as time T1; and (5) irradiate the workpiece 10 with a laser beam for cutting the workpiece 10 under the original work conditions.

According to the embodiment provided by adding the cooling command section 201 to the first or second embodiment, the cooling period of the time T1 is provided after execution of restart work at distance L1 at the restart work time. Therefore, the embodiment has the effect of preventing overheating from causing work failure in addition to the effects of the first and second embodiments.

(Embodiment 4)

Figure 9:
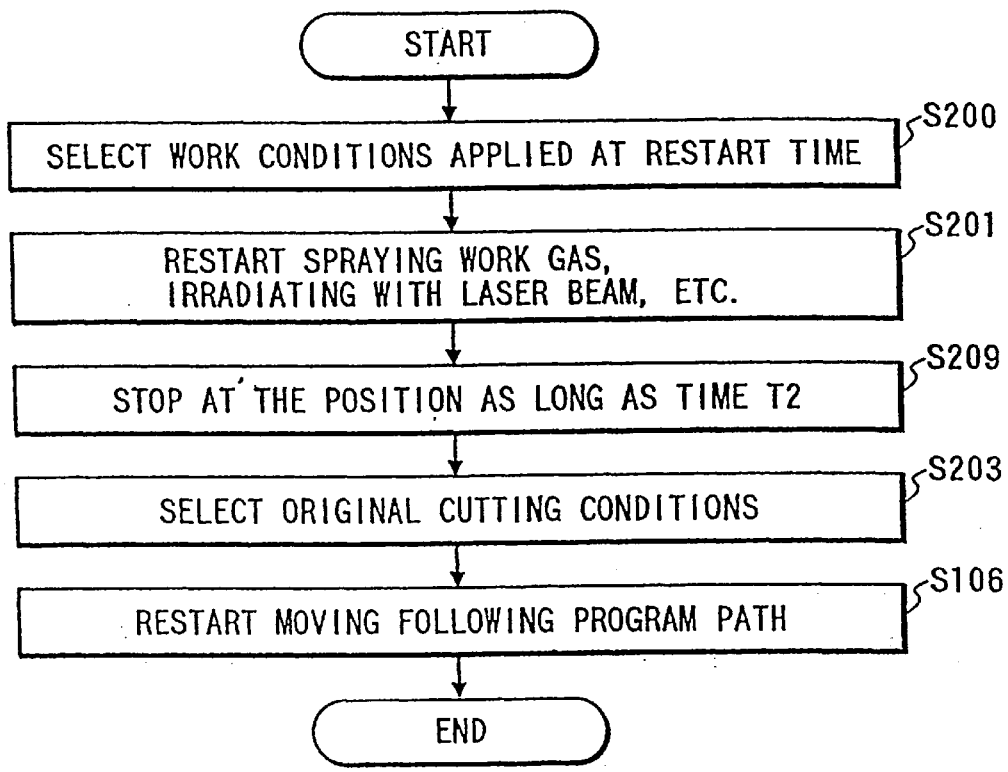
FIG. 9 is a work process flowchart according to a fourth embodiment of the invention.

FIG. 9 is a process flowchart of a fourth embodiment of the invention. The embodiment is provided for an alternative method for uncut portion treatment in the bottom face of a workpiece at the work stop position. The operation will be discussed. Steps S200 to S203 and S106 in FIG. 9 are the same as those in FIG. 4 except for restart work conditions selected at step S200. The restart work conditions selected at step S200 in FIG. 9 are set for irradiating the workpiece with a laser beam at the position to remove an uncut portion. For example, piercing conditions are applied. The laser beam irradiation time is measured with a timer 26 and moving stops at the position as long as predetermined time T2 with the workpiece irradiated with a laser beam, etc., under the conditions at step S209. Meanwhile, removing the uncut portion is completed. Then, the original cut conditions are selected at step S203 and the cutting is restarted at step S106. If condition change in the first to third embodiments is also used in the cut starting portions at steps S203 and S106, furthermore the effect of preventing work failure is produced.

Figure 10:
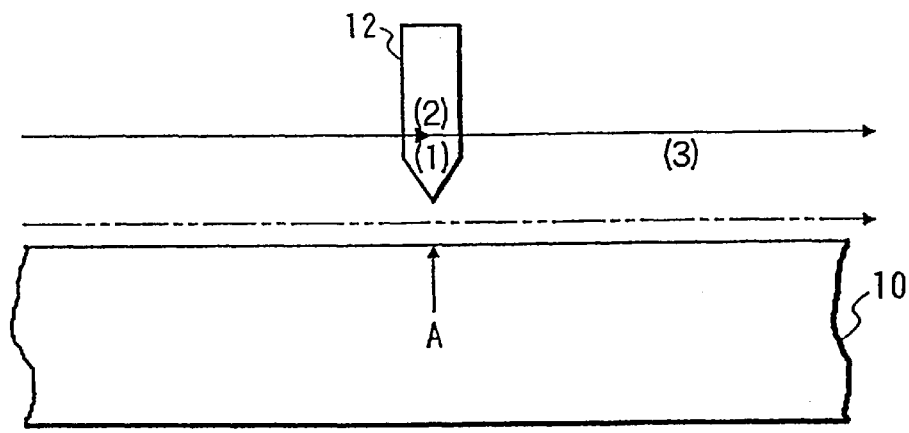
FIG. 10 is a drawing showing how to work on a workpiece according to the fourth embodiment of the invention.

FIG. 10 shows the working method in the embodiment.

(1) Interrupt the work at position A of workpiece 10 and then restart the work;

(2) irradiate the workpiece 10 with a laser beam at the position as long as the time T2 under the work restart conditions; and (3) cut the workpiece 10 under the original work conditions.

According to the embodiment, the remaining portion in the bottom face of the workpiece at the cutting interrupt time is treated at the work restart time under appropriate piercing conditions before the work is executed. Therefore, work failure at the work restart time can be prevented and if the embodiment is combined with the first to third embodiments, work failure is furthermore reduced.

(Embodiment 5)

Figure 11:
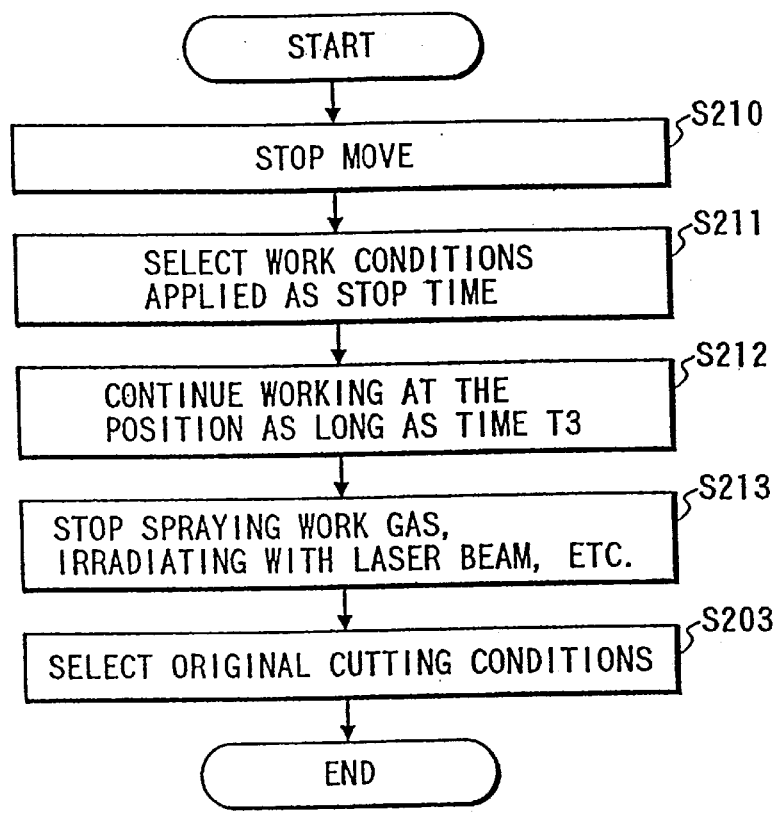
FIG. 11 is a work process flowchart according to a fifth embodiment of the invention.

FIG. 11 is a process flowchart at the work stop time in a fifth embodiment of the invention. In the embodiment, when a work stop command is received, an uncut portion in the bottom face of a workpiece is removed before the work is stopped. When a work stop command is given, a move command section stops the move at step S210 in response to work interrupt information from an interrupt/restart determination section. When the move stops, a work condition command section calls and sets work conditions applied at the work stop time at step S211. The work conditions applied at the work stop time are set for removing a cut lag portion in the bottom face of a workpiece made at the move stop time; for example, piercing conditions are applied. Cut conditions at the work stop time are saved before change to the conditions applied at the work stop time is made. The time after changing to the conditions applied at the work stop time is measured with a timer 26 and a wait is made for predetermined time T3 at step S212. Meanwhile, the uncut portion is removed. Next, the work condition command section stops irradiating with a laser beam, spraying a work gas, etc., at step S213. Then, the stored original cut conditions are set at step S203, whereby when the work is restarted, the uncut portion in the bottom face of the workpiece has been removed, so that work failure can be prevented. However, when it is necessary to immediately stop laser beam irradiation to stop the work due to an alarm, etc., a wait cannot be made for the time T3 and the fifth embodiment cannot be applied.

Figure 12:
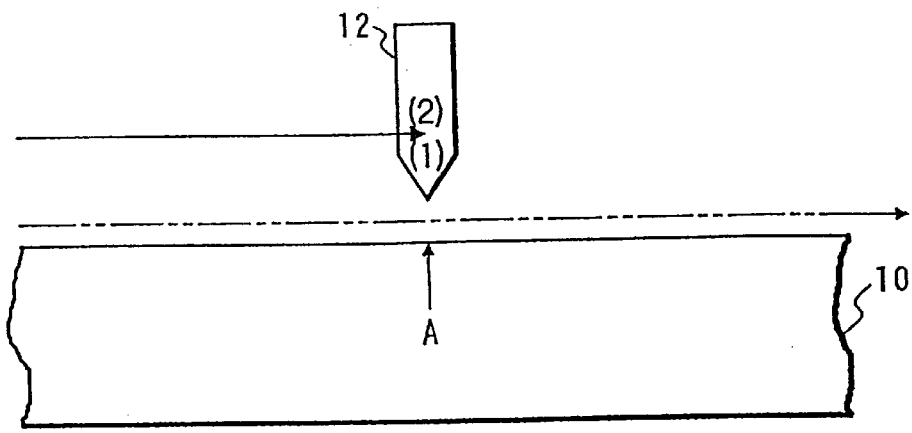
FIG. 12 is a drawing showing how to work on a workpiece according to the fifth embodiment of the invention.

FIG. 12 shows the working method in the embodiment.

(1) Interrupt the work at position A of workpiece 10; and (2) after the move stops, irradiate the workpiece 10 with a laser beam at the position as long as the time T3 under the work stop conditions.

(Embodiment 6)

Figure 13:
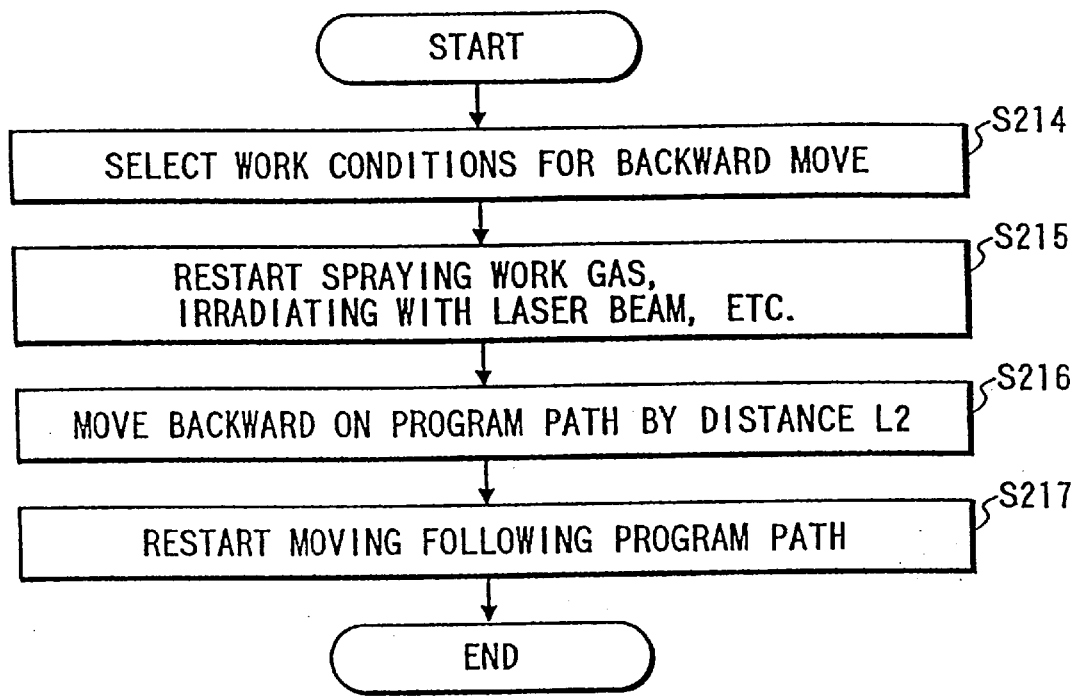
FIG. 13 is a work process flowchart according to a sixth embodiment of the invention.

FIG. 13 is a process flowchart in a sixth embodiment of the invention. As an alternative method for handling an uncut portion in the bottom face of a workpiece, a backward move on the program path may be made from the work stop position for again working on the workpiece before the work stop position. However, if the work speed is fast, the actual work path may deviate from a move command because of the servo following ability, etc. In this case, if a backward move on the program path is made, it is not returned as the cut path before the work stop, and the backward move position does not exist on the cut path. If the position is irradiated with a laser beam, work failure occurs. The sixth embodiment is provided for taking countermeasures against it. When a work continuation command is given, a work condition command section selects work conditions for backward cutting at step S214 in response to work restart information from an interrupt/restart determination section and restores the functions required for work such as work gas spraying and laser beam irradiation to the state before the temporary stop at step S215. Next, a move command section makes a backward move on the program path by distance L2 at step S216. Therefore, even if the backward path deviates from the cut path made before the work stop, a backward move is made while the workpiece is being cut at step S216. Next, the work condition command section restores the work conditions to the original cut conditions at step S217 and the move command section starts a move in the original direction again following the program path, whereby the state becomes as if the work were continued nonstop, preventing work failure from occurring.

Figure 14:
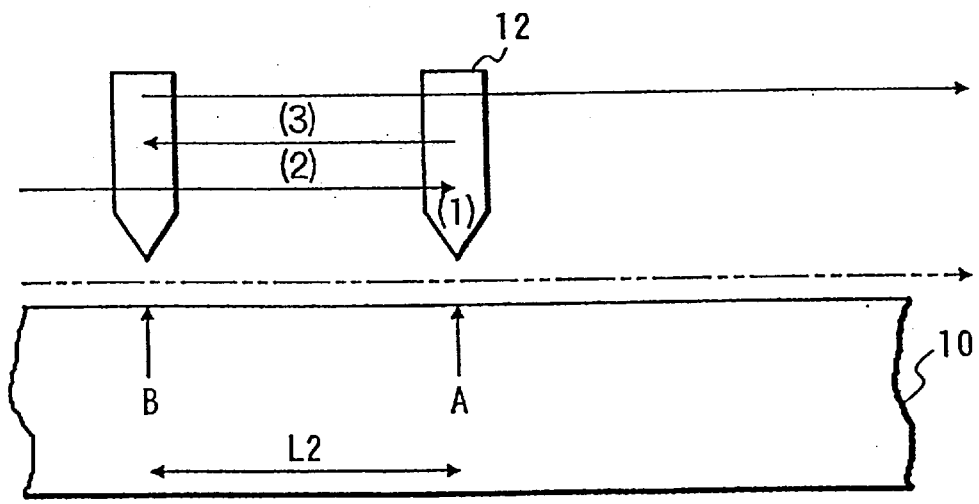
FIG. 14 is a drawing showing how to work on a workpiece according to the sixth embodiment of the invention.

FIG. 14 shows the working method in the embodiment.

(1) Interrupt the work at position A of workpiece 10 and then restart the work;

(2) irradiate the workpiece 10 with a laser beam under backward move conditions for cutting the workpiece 10 by the distance L2 on the reverse program path; and (3) cut the workpiece 10 following the program path under the original work conditions.

(Embodiment 7)

Figure 15:
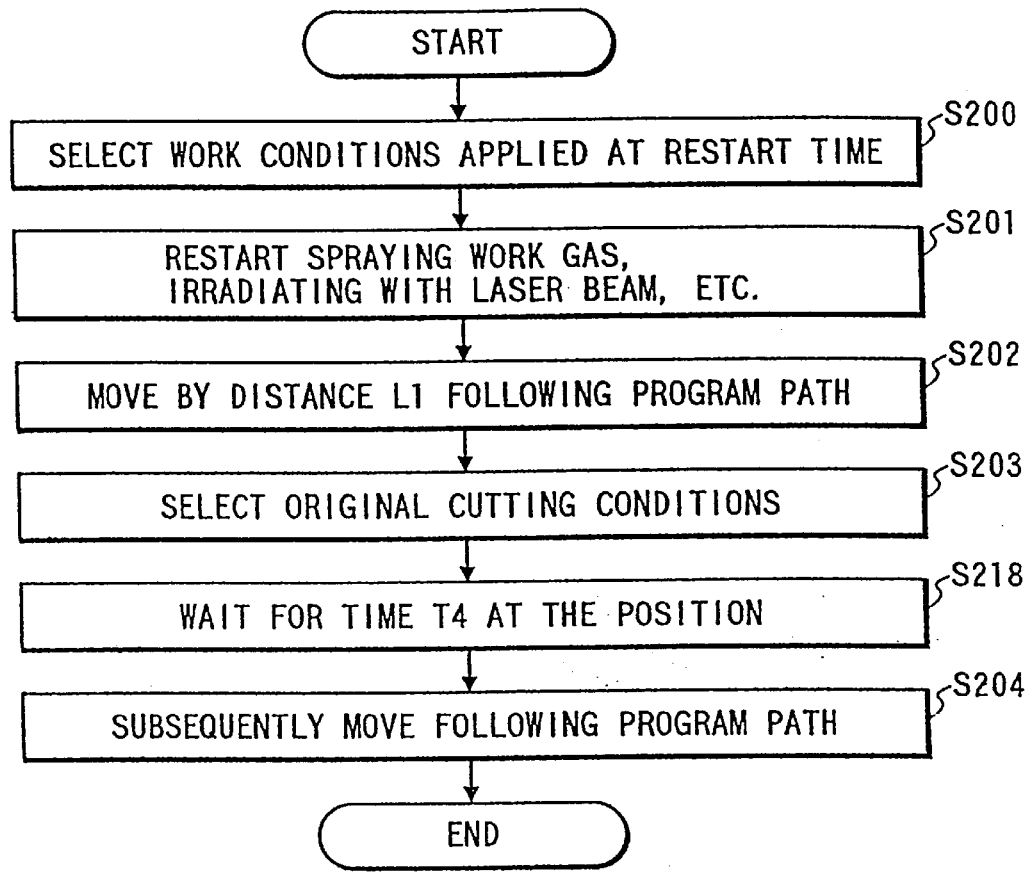
FIG. 15 is a work process flowchart according to a seventh embodiment of the invention.

FIG. 15 is a process flowchart in a seventh embodiment of the invention. The first to sixth embodiments can provide countermeasures against an uncut portion in the bottom face of a workpiece. However, if a change is made from the low-output work restart conditions or the laser beam irradiation stop state to the original cut conditions, it takes time in stabilizing of laser oscillator output and the heat lens state of a lens in a work head and a mirror in the oscillator. Therefore, if cutting is started immediately after the conditions are changed, work failure may occur. The seventh embodiment is provided for taking countermeasures against it. Steps S200 to S204 in FIG. 15 are the same as those in FIG. 2. The laser beam irradiation time is measured with a timer 26 and at step S218, a wait is made for move start at step S204 for predetermined time T4. Meanwhile, the laser oscillator output and heat lens state are stabilized.

Figure 16:
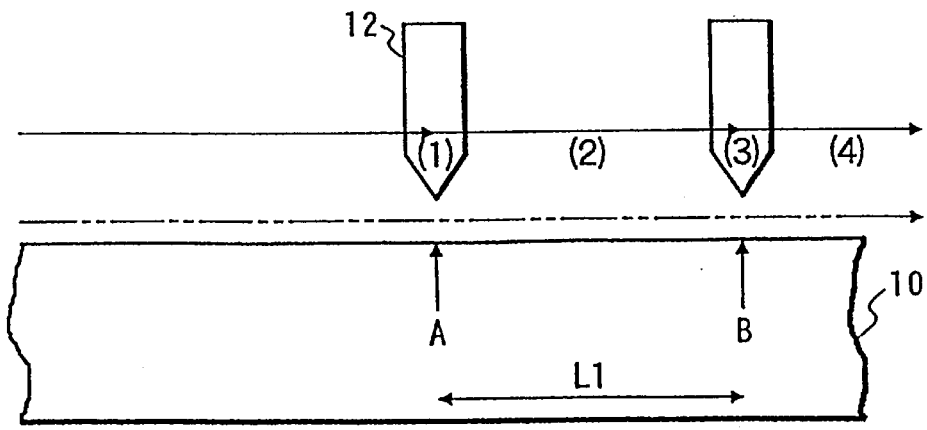
FIG. 16 is a drawing showing how to work on a workpiece according to the seventh embodiment of the invention.

FIG. 16 shows the working method in the embodiment.

(1) Interrupt the work at position A of workpiece 10 and then restart the work;

(2) cut the workpiece 10 following the program path by distance L1 under work restart conditions;

(3) irradiate the workpiece 10 with a laser beam under the original work conditions at and wait for the time T4; and (4) cut the workpiece 10.

(Embodiment 8)

The optimum numeric values of the distances L1 and L2 and the times T1 to T4 in the first to seventh embodiments vary depending on the workpiece. Therefore, fixed values cannot cover different workpieces and it is inconvenient to set the values in parameters each time. To take countermeasures against it, FIG. 17 shows an embodiment wherein the parameters such as L1 are added to the work condition data corresponding to workpieces. The work condition data as shown in FIG. 17 is registered for each workpiece. Which work restart type in the embodiments to execute is set in data 28. If 0 is set, the process shown in the embodiments is not executed. Since workpieces like thin plates do not require any process shown in the embodiments, 0 is set. The distances L1 and L2 and the times T1 to T4 are set in data 29 to 34. The same workpiece may or may not require the processes shown in the embodiments depending on the cutting speed. If the RAM capacity has a margin, the data pieces 28 to 34 may be set in the conditions of the first condition group and later.

According to the invention (aspects 1–4 and 8), to once stop the current cutting being executed in automatic running and then restart the cutting at the stop position, the workpiece can be worked on under optimum restart work conditions, such as low speed and low output, at a predetermined distance after the restart or at the position without giving a new restart work condition command, thereby removing the bottom face cut lag behind the top face of the workpiece, smoothing a flow of molten metal, and suppressing work failure at the restart work time.

According to the invention (aspects 5–7), to once stop the current cutting being executed in automatic running and then restart the cutting at the stop position, the cooling time and/or the laser beam stabilizing time can be provided before the work is restarted under optimum restart work conditions and a return is made to the work command operation based on the work program command without giving a new restart work condition command. Thus, the bottom face cut position lag behind the top face of the workpiece is lessened for smoothing a flow of molten metal, and overheating prevention and/or laser beam stabilization are intended for suppressing work failure at the restart work time.

According to the invention (aspect 9), to once interrupt the current cutting being executed in automatic running, the workpiece is worked on under optimum interrupt work conditions and the bottom face cut position lag behind the top face of the workpiece is removed without giving a new interrupt work condition command before the work is interrupted. Thus, a flow of molten metal is smoothed at the work restart time and work failure at the restart work time is suppressed.

According to the invention (aspect 10), to once stop the current cutting being executed in automatic running and then restart the cutting at the stop position, the workpiece is cut while a backward move on the moving path by a predetermined distance under backward move work conditions, and then the cutting is continued again in the original work direction under the original work conditions. Thus, the cut face at the work restart time is prevented from becoming discontinuous and the quality of the workpiece is improved.

According to the invention (aspect 11), to change laser beam irradiation output from low to high output during cutting in automatic running, moving is stopped at the output change position and the workpiece is irradiated with a high-output laser beam for a predetermined time, then the move is restarted. Thus, the work can be restarted in the state in which the laser beam applied to the workpiece is stable, and the quality of the workpiece is improved.

What is claimed is:

1. A laser beam machining method for irradiating a workpiece making a relative move in accordance with a work program with a laser beam for cutting the workpiece, to interrupt the cutting being executed and restart the cutting at an interrupt position, said method comprising the steps of:

(a) after restart of the cutting; working on a moving path specified in the work program under restart work conditions;

(b) determining a total distance through which the workpiece moves under the restart work conditions as a restart work distance, (c) comparing the restart work distance with a predetermined distance L1;

(d) continuing the working under restart conditions of step (a), the determining of total distance of step (b) and the comparing of step (c) until the restart work distance matches L1;

(e) changing the restart work conditions to original work conditions for continuing the cutting when the restart work distance matches L1.

2. The method of claim 1, wherein the restart work conditions comprise a lower irradiation output than the original work conditions and wherein said step (e) comprises a sub-step of pausing the workpiece for a predetermined time to permit stabilizing of the lower irradiation output back to the original work conditions and then moving the workpiece to continue cutting after lapse of the predetermined time.

3. A laser beam machining method for irradiating a workpiece making a relative move in accordance with a work program with a laser beam for cutting the workpiece, to interrupt the cutting being executed and restart the cutting at an interrupt position, said method comprising the steps of:

cutting the workpiece while making a backward move of a moving path before an interrupt specified in the work program by a predetermined distance under backward move work conditions; and continuing cutting the workpiece again in an original cutting direction under original work conditions.

4. A laser beam machining method for irradiating a workpiece making a relative move in accordance with a work program with a laser beam for cutting the workpiece, said method comprising the steps of:

stopping a work path move of the workpiece for a predetermined time as a work condition is changed from a low-output laser beam to a high-output laser beam, wherein the predetermined time corresponds to a stabilizing time for the high-output laser beam; and irradiating the workpiece with the high-output laser beam.

* * * * *